United States Patent [19]

Hosch

[11] Patent Number: 4,550,136

[45] Date of Patent: Oct. 29, 1985

[54] METHOD FOR POLYMERIZING METHYL METHACRYLATE

[75] Inventor: Ludwig Hosch, Michelstadt, Fed. Rep. of Germany

[73] Assignee: Rohm GmbH, Darmstadt, Fed. Rep. of Germany

[21] Appl. No.: 424,407

[22] Filed: Sep. 27, 1982

Related U.S. Application Data

[63] Continuation-in-part of Ser. No. 409,714, Aug. 19, 1982, abandoned, which is a continuation of Ser. No. 130,092, Mar. 13, 1980, abandoned.

[30] Foreign Application Priority Data

Apr. 6, 1979 [DE] Fed. Rep. of Germany ....... 2913853

[51] Int. Cl.$^4$ .................... C08F 120/14; C08L 33/12

[52] U.S. Cl. ..................................... 524/718; 524/99; 526/204; 526/329.7

[58] Field of Search ............... 526/204, 329.7; 524/99, 524/718

[56] References Cited

U.S. PATENT DOCUMENTS 3,759,881 9/1973 Holder ................................ 526/204

Primary Examiner—Harry Wong, Jr.
Attorney, Agent, or Firm—Curtis, Morris & Safford

[57] ABSTRACT

A method for making a methyl methacrylate polymer having high resistance to ultraviolet radiation and thermal damage by polymerizing methyl methacrylate or a monomer mixture predominantly comprising methyl methacrylate in the presence of a highly sterically hindered amine such as 2,2,6,6-tetramethyl piperidine.

7 Claims, 1 Drawing Figure

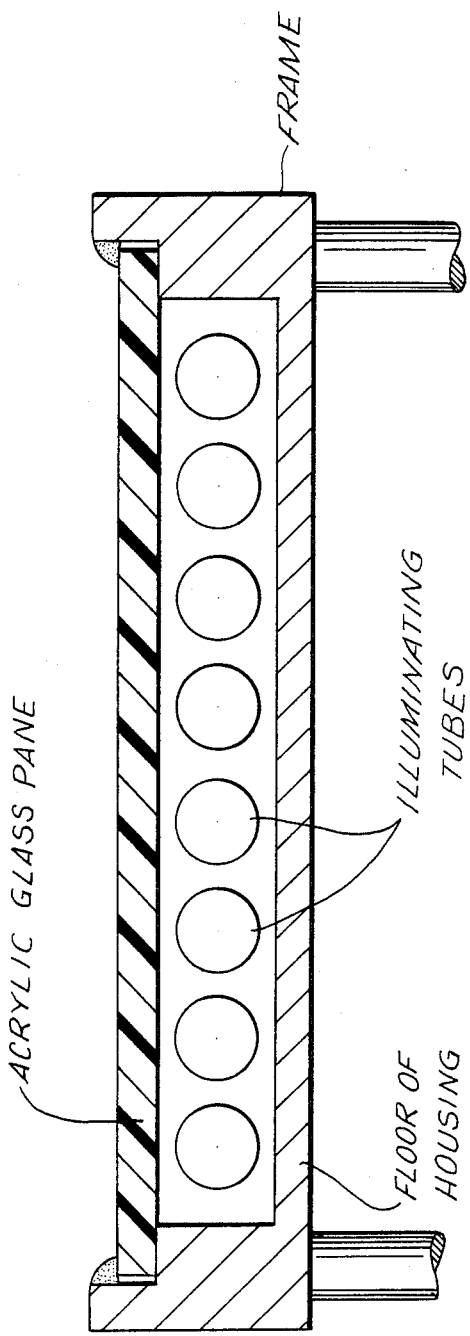

METHOD FOR POLYMERIZING METHYL METHACRYLATE

This application is a continuation-in-part of Ser. No. 409,714 filed Aug. 19, 1982 and now abandoned, which is in turn a continuation of Ser. No. 130,092 filed Mar. 13, 1980 and now abandoned.

The present invention relates to the preparation of polymers of methyl methacrylate, of high resistance to ultraviolet radiation and thermal damage, by a polymerization proceeding in the presence of a sterically hindered amine.

The polymers of methyl methacrylate are already distinguished from other polymers by a high resistance to the aforementioned influences, but nevertheless certain damage does occur to these polymers on extended exposure. Thus, for example, a decrease in the Vicat softening temperature from 8°–10° C. is observed if polymethyl methacrylate is heated to a temperature of 160° C. for purposes of shaping it. The transparency for ultraviolet radiation decreases considerably after extensive weathering or after an extended exposure to the influences of ultraviolet radiation. At the same time, a decrease in the molecular weight can be determined, which has impaired mechanical properties as a consequence.

Similar damage is known also to occur in other polymers, such as polyolefins, polystyrene, polyvinyl chloride, or polyesters. The damage can be reduced, however, if so-called light-protective agents are worked into these polymers during thermoplastic working. Highly effective light-protective agents are, for example, derivatives of 2,2,6,6-tetramethyl piperidine. [H. J. Heller, et al. Pure Appl. Chem. 36 (1–2), 141–61 (1973)]. These compounds hinder free radical decomposition reactions in the polymers to the extent that, on the other hand, they react with hydroperoxide formed by ultraviolet radiation and the influence of oxygen and, on the other hand, capture free radicals. The compounds have been included in polystyrene according to certain prior art, and into polyolefins or polyvinyl chloride in other prior art, while these materials are in a thermoplastic condition and optionally in combination with ultraviolet absorbers.

On attempting to protect forming masses comprising polymethyl methacrylate from the damaging influences of the kind described above in a corresponding fashion by working in compounds of 2,2,6,6-tetramethyl piperidine, very low values for the transmission of ultraviolet radiation were observed from the beginning and a further decrease in transmission was observed after irradiation with ultraviolet light. 0.25 percent by weight of di-(2,2,6,6-tetramethyl-piperidyl-4)-sebacate (TPS) were in each case worked into two batches of formable material in an extruder. The materials were worked into a 6 mm thick plate and their transmission of ultraviolet radiation was measured, after increasing irradiation times, by means of an ultraviolet-A-radiator (300–400 nm) and an ultraviolet-B-radiator (260–320 nm). The results are reported in following Table I in comparison with a forming mass prepared according to the present invention.

TABLE I

| Forming mass | Light-protective agent (% by weight) | Radiation Type | Transparency at 300 nm (in %) Duration of Radiation (hours) | | | |
|---|---|---|---|---|---|---|
| | | | 0 h | 72 H | 250 h | 1000 h |
| Copolymer: 95% methyl-methacrylate and 5% methyl-acrylate | none | A | 65 | 65 | 62 | 45 |
| | | B | 65 | 48 | 31 | 28 |
| | 0.25% TPS, homogenized in the extruder | A | 55 | 52 | 50 | 43 |
| | | B | 54 | 51 | 43 | 37 |
| Methyl methacrylate Homopolymer | 0.25% TPS, homogenized in the extruder | A | 55 | 52 | 49 | 36 |
| | | B | 55 | 52 | 43 | 27 |
| | 0.25% TPS, polymerized in situ according to the invention | A | 83 | 80 | 76 | — |
| | | B | 83 | 81 | 72 | — |

The transmission values found for the forming masses with TPS worked thereinto while the masses are in a thermoplastic condition appear to indicate that this additive is unsuitable for polymers comprising polymethyl methacrylate. It must appear even less promising to work in the same additive before or during the preparation of the polymer by means of free radical polymerization, since such a process has not been at all known in the preparation of those polymers in which TPS detectably shows a light-protective effect. Further, a considerable disturbance of the free radical polymerization was to be expected as a result of the free radical capturing property of TPS.

Surprisingly, these effects do not occur during the free radical polymerization of methyl methacrylate. The polymerization takes place in the presence of the aforementioned compound without an extended inhibition period, at an unchanged rate, and leads to high molecular weight products. Surprisingly, not only is the initial transmission higher, but also transmission after extended irradiation is higher if the light-protective agent is added already at polymerization and not first while the material is in a thermoplastic condition. This is evident from the last lines of the aforementioned Table.

The thermal stabilization is evident also in the preparation of PMMA-sheets from a pre-polymerized syrup. Methyl methacrylate is first reacted in a first reaction stage to a so-called syrup having a polymer content of about 25%. If a sheet is prepared in a flat chamber formed between two glass plates by the polymerization of such a syrup, a Vicat softening temperature of 119° C. is found in such a sheet. After heating for one-half hour at 160° C., the Vicat softening temperature sinks to 11° C. If a thioether, for example thiodipropionic acid-dilauryl ester is added as thermal stabilizer to the syrup, a Vicat softening temperature of only 110° C. is obtained in the fully-polymerized sheet, which, however, on one-half hour's heating at 160° C. only sinks minimally to 108°–109° C. If, in contrast, 0.5% by weight of di-(tetramethyl-piperidyl)-sebacate (TPS) is added to the syrup according to the present invention, a polymethyl methacrylate sheet having a Vicat softening temperature of 119° C. is obtained. On one-half hour's heating at 160° C., the Vicat value does not decrease significantly and remains, at 117° C., at a value which cannot be obtained with any other material.

The accompaning drawing shows a solarium structure comprising illuminating tubes, generating ultraviolet-light, mounted within a housing and protected by a pane of acrylic glass transparent to ultraviolet light.

When polymethyl methacrylate sheets are used in greenhouses or in the construction of solaria, it is of significance that the transmission of ultraviolet radiation is essentially maintained throughout the lifetime of these constructions. Pure polymethyl methacrylate is not fully satisfactory from this point of view: on irradiation of a sheet 6 mm thick with an ultraviolet lamp having a radiation maximum at 300 nm, the transmission decreases at this wave length from an initial value of 82% to about 12% within 1000 hours. If, in contrast, a corresponding polymer sheet 6 mm thick prepared according to the invention with a content of 0.25% of di-(tetramethyl-piperidyl)-sebacate is prepared, the transmission at 300 nm over this period decreases only to about 63%. Still more advantageous results are found in copolymers comprising 88% of methyl methacrylate and 12% of methyl acrylate. Without TPS, an initial value of 76% transmission is observed which, after 1000 hours, is 49%. With 0.25% TPS, a sheet is obtained with an initial transmission of 80% which does not measurably decrease within an irradiation period of 1000 hours. If the TPS additive is replaced by other materials known to be stabilizers against photo-oxidative damage, a strong decrease in the ultraviolet transmission is observable. Thus, after 1000 hours, at a content of 0.05% of di-tert.-dodecyl-disulfide, a transmission of about 20% is obtained; with 0.25% of thio-dipropionic-acid-dilauryl ester the transmission is 17%; and with 0.25% of bis-(2-methoxycarbonyl-propyl)-sulfide a transmission of only 12% is observed.

On free weathering of a polymethyl methacrylate sheet, a slow decrease in molecular weight occurs, which decrease is recognizable by a decrease in the reduced viscosity. At a content of 0.05% of di-tetramethylpiperidyl)-sebacate plus 0.05% of a conventional ultraviolet absorber such as benztriazole or benztriazole derivatives, the reduced viscosity decreases from an initial value, $\eta_{sp}/C$ of 1175 ml/g to a value of 1029 ml/g within a period of two years. Without the additive according to the invention, a decrease of the reduced viscosity to 545 ml/g is determined. When additives absorbing ultraviolet radiation are used, alone, their protective effect is only of advantage to the polymethyl methacrylate molecules within the interior of the sheet. However, the effect of the additives according to the present invention extends also to the sheet surfaces. Thus, surface corrosion will also be avoided.

The additives employed according to the invention are sterically hindered amines of the formula

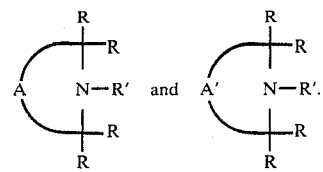

In the formula, R signifies the same or different alkyl groups, particularly lower alkyl groups having 1 to 4 carbon atoms, preferably methyl groups. R' is hydrogen or alkyl—preferably lower alkyl—, A is a 2- or 3-membered alkylene chain which closes the molecule to form a saturated heterocyclic ring and A' is such a 2- or 3-membered alkylene chain which is bound to a further organic group. Preferably, R' is hydrogen and A is a 3-membered alkylene chain.

Particularly preferred amines are those of the formula

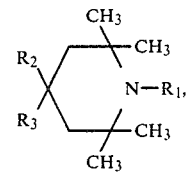

wherein $R_1$ is hydrogen or alkyl having 1 to 4 carbon atoms, preferably linear alkyl having 1 to 4 carbon atoms, $R_2$ taken alone is hydrogen or alkyl having 1 to 10 carbon atoms, preferably hydrogen, $R_3$ taken alone is alkyl having 1 to 10 carbon atoms or is —X—CO—$R_4$, wherein X is —O— or —NH— and $R_4$ is alkenyl having 2 or 3 carbon atoms, preferably —X—CO—$R_4$, or $R_2$ and $R_3$ taken together with the carbon atom to which they are attached, form a 5- or 6-membered heterocyclic ring wherein the heteroatoms are oxygen and/or nitrogen, which ring may be substituted by groups such as alkyl and/or oxo groups.

Further preferred amines for use according to the present invention are those of the formula

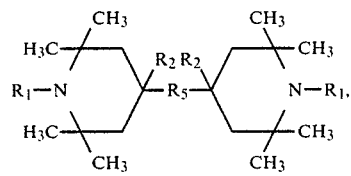

wherein both $R_1$ and $R_2$ have their earlier generic and preferred meanings and $R_5$ is —O—CO—Hydrocarbon—CO—O— or a polymer backbone of the formula

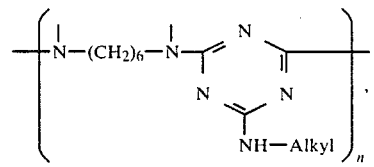

wherein n has an average numerical value greater than one and Alkyl is alkyl having up to 8 carbon atoms. Preferably $R_5$ is —O—CO—Hydrocarbon—CO—O—, wherein Hydrocarbon is preferably alkylene having 2 to 20 carbon atoms, or may be such alkylene substituted by phenyl or by substituted phenyl. Compounds wherein $R_2$ is hydrogen and $R_5$ is $(B)_x$, where B is —O—CO—$(CH_2)_y$—CO—O—, x is 0 or 1, and y is an integer between 2 and 10 are especially preferred.

Finally, a still further class of amines useful in the invention has the formula

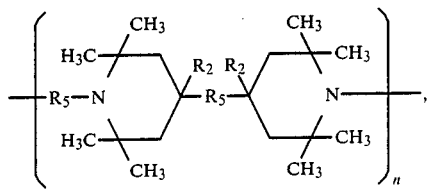

wherein $R_2$, $R_5$ and n have their earlier meanings. Preferably, again, $R_5$ is —O—CO—Hydrocarbon—CO—O— wherein, preferably, Hydrocarbon is preferably alkylene having 2 to 20 carbon atoms.

Especially preferred sterically hindered amines are those which are derived from 2,2,6,6-tetramethylpiperidine such as bis-(2,2,6,6-tetramethyl-piperidyl-4)- or (2,2,6,6-tetramethyl-piperidyl-4)-esters of aliphatic dicarboxylic acids having 4 to 12 carbon atoms, for example sebacic acid. In these latter compounds, alkylene chain A is further bound by an oxygen atom into an organic ester. The sterically hindered amines are generally added in amounts from 0.01 to 1 percent, preferably from 0.1 to 0.5%, in each case calculated on the weight of the monomers to be polymerized.

The polymerization of the methyl methacrylate according to the invention as a rule occurs in bulk, i.e. in the absence of significant amounts of inert solvents or distributing agents. Preferably, polymerization is carried out in a flat chamber formed between two parallel glass plates and a sealing gasket extending around the rim, whereby polymethyl methacrylate sheets having a thickness from 2 to 20 mm in thickness are prepared.

In addition to methyl methacrylate which comprises at least 80% of the monomers to be polymerized, one or more other comonomers can be employed. As examples, the alkyl esters of acrylic acid and of methacrylic acids, which esters have at least two carbon atoms in the alkyl portion, can be mentioned. Alkyl esters of acrylic acid having 1 to 4 carbon atoms in the alkyl portion are the preferred comonomers and are preferably added in an amount up to 15% by weight of the total monomer weight. Further comonomers which can be mentioned include styrene, vinyl acetate, as well as—in subordinate amounts—monomers having two or more polymerizable double bonds, for example divinyl benzene, triallyl cyanurate, ethylene glycol-dimethacrylate, allyl acrylate or allyl methacrylate.

The free-radical polymerization of the monomers can be initiated with conventional amounts of the usual free radical initiators. For example, peroxides such as dibenzoyl peroxide, dilauroyl peroxide, tert.-butyl-perpivalate or tert.-butyl-percarbonate are employed, or azo initiators such as azo-bis-isobutyronitrile or azo-bis-isobutric acid methyl ester. According to the decomposition temperature of the free radical-forming initiators, the polymerization is carried out in a known fashion at a temperature between 20° C. and 120° C., whereby the lowest temperatures in this range are achieved using redox initiators. The preferred polymerization temperature is 40° C. to 100° C.

It is surprising that the amines added according to the present invention have no influence on the decomposition temperature and decomposition rate of the initiators. With conventional initiator amounts of 0.02-0.1%, by weight of the monomer, polymers are obtained having a molecular weight of 500,000 or more. Particularly preferred molecular weight regions are between 1 and 2 million, on the one hand, and at more than 5 million, on the other hand. By polymerization in the presence of chain transfer agents, particularly mercaptans, the molecular weight can be held within low limits. However, molecular weights lower than 150,000 are not preferred.

The polymers prepared according to the method of the present invention, particularly polymethyl methacrylate sheets, are particularly useful for all purposes in which there is a demand for a continuous high transmission of ultraviolet radiation, e.g. in solaria. These contain illuminating tubes, mounted under a planar or trough-shaped surface formed from a polymethyl methacrylate sheet, which emit ultraviolet radiation having a high intensity in a region above 280 nm. A further important field of use is for preparing bodies, for example lamp coverings, shaped by the deformation of polymethyl methacrylate sheets. The latter, in contrast to shaped bodies formed from conventional polymethyl methacrylate sheets, are characterized by an increased resistance to heat.

A better understanding of the present invention and of its many advantages will be had by referring to the following specific Examples, given by way of illustration. In the Examples, the "parts" mentioned are always parts by weight.

EXAMPLE 1

100 parts of methyl methacrylate are combined with 0.1 part of dilauroyl peroxide, 0.4 part of dodecyl mercaptan, and 0.25 part of di-(2,2,6,6-tetramethyl-piperidyl-4)-sebacate (TPS) and are polymerized in a closed film bag for 20 hours at 55° C. and for 10 hours at 100° C. The shaped mass produced had a Vicat softening temperature of 109° C.

A 6 mm thick plate was prepared from the forming mass and its transmission of ultraviolet radiation of 300 nm was measured after the influence of an ultraviolet-A-radiator and an ultraviolet B-radiator. During the radiation, the sample was put directly against the radiation source.

TABLE II

| Transmission values: | | | | | |
| --- | --- | --- | --- | --- | --- |
| Duration of radiation | | 0 | 72 | 250 | hours |
| Type of radiator | A: | 83 | 80 | 76 | % |
| | B: | 83 | 81 | 72 | % |

EXAMPLE 2

100 parts of methyl methacrylate are combined with 0.1 part of dilauroyl peroxide, 0.05 part of TPS, and 0.05 part of 2-hydroxy-5-methyl-phenyl-benztriazole (an ultraviolet protective agent) and polymerized in a flat chamber formed between two glass plates and a peripheral sealing gasket therebetween for 20 hours at 45°–50°

C. and for three hours at 115° C. to form a clear acrylic glass plate 6 mm in thickness.

For comparison, a plate was prepared in the same manner without the addition of TPS.

The reduced solution viscosity was measured after different stressing of the material, as reported below in Table III. The "Xeno" apparatus is a device for rapid weathering. It has a xenon arc lamp simulating the solar spectrum and having an irradiating strength of 180,000 lux. 1000 hours in the apparatus under appropriate adjustable temperature and humidity conditions approximate one year's free weathering in Central Europe.

TABLE III

| Type of stress | Reduced viscosity ($\eta_{sp}$/C) (ml/g) | |
|---|---|---|
| | Sample according to the invention containing TPS | Comparison material without TPS |
| unstressed | 1175 | 893 |
| after heating for 30 minutes at 180° C. | 1162 | 768 |
| after 1000 hours in a "Xeno" text apparatus | 1019 | 498 |
| after 2 years free weathering | 1029 | 545 |

EXAMPLE 3

100 parts of methyl methacrylate are polymerized together with 0.02 part of tert.-butyl-per-neodecanoate, 0.05 part of dilauroyl peroxide, and 0.05 part of TPS within 15 hours at 45° C. and for three hours at 120° C. in a flat chamber (cf. Example 2) to form a sheet 6 mm thick. For comparison, a sheet without the TPS additive was prepared. Both plates have a Vicat softening temperature of 119° C. After tempering for 30 minutes at 160° C. (for the purpose of thermoelastic shaping), the Vicat softening temperature of the sheet according to the present invention has decreased to 117° C.: that of the comparison sheet has decreased to 111° C.

For testing thermal decomposition, the sheets are heated to a temperature at which a loss of weight of 1% occurs within five minutes. These temperatures are:
Sheet with TPS=270° C.
Sheet without TPS=220° C.

EXAMPLE 4

100 parts of methyl methacrylate are polymerized in a flat chamber (cf. Example 2) together with 0.05 part of azo-bis-isobutyronitrile and 0.25 part of TPS for 16 hours at 40°-45° C. and for 3 hours at 120° C. to form a sheet 6 mm thick. For comparison, a sheet is prepared without the addition of TPS. The transmission of the sheets to ultraviolet radiation after irradiation with an ultraviolet A-radiator is measured:

TABLE IV

| | Transmission for 300 nm-radiation after ultraviolet A-radiation of | | | |
|---|---|---|---|---|
| | 0 | 250 | 1000 | Hours |
| Sheet with TPS | 80 | 68 | 50 | % |
| Sheet without TPS | 80 | 32 | 12 | % |

EXAMPLE 5

Example 4 is repeated, however, instead of methyl methacrylate, a mixture of this ester with 12% by weight of methyl acrylate is used.

TABLE V

| | Transmission for 300 nm-radiation after ultraviolet A-radiation of | | | |
|---|---|---|---|---|
| | 0 | 250 | 1000 | hours |
| Plate with TPS | 80 | 78 | 80 | % |
| Plate without TPS | 76 | 40 | 49 | % |

EXAMPLE 6

Corresponding to Example 4, a sheet prepared from a mixture of 88% by weight of methyl methacrylate and 12% by weight of ethyl acrylate is prepared. The Vicat softening temperature is 99° C. The transmission for ultraviolet radiation A-radiation is 75%.

EXAMPLES 7-29

A number of polymethylmethacrylate homopolymers are prepared according to the technique of Example 4, with the incorporation of one of various hindered amine structures given more in detail infra. Similarly a number of methylmethacrylate/methyl acrylate copolymers (88/12) are prepared by the technique of Example 6, again with the incorporation of one of various hindered amines of the type discussed earlier herein.

The thermal stability and/or resistance to ultraviolet light of the samples were determined.

The results are given in Table VI below, wherein Examples 28 and 29 are comparison examples using polymers free of any amine additive.

In the Table, thermal stability is reported in terms of the change in the Vicat softening temperature of the polymer (measured according to DIN 53460) brought about by heating the polymer for 30 minutes at 160°-180° C. and/or by determining the decomposition temperature of the polymer.

Resistance to ultraviolet is measured by determining the reduced viscosity ($\eta$ in ml/g) of the samples after 1000 hours of radiation with ultraviolet light in a "Xeno" test apparatus and/or after 1 year of atmospheric weathering. The measurements are made with polymer samples 0.5 mm thick, and the decrease in viscosity observed is a measure of reduction in molecular weight due to decomposition.

Resistance to ultraviolet is also determined by measuring the transmission of the polymer sample for ultraviolet light of 300 nanometer wavelength before irradiation with ultraviolet and after 1100 hours of exposure to ultraviolet in a "Xeno" test apparatus.

"MM" in the Table indicates a polymethyl methacrylate homopolymer: "MM/MA" signifies an 88/12 copolymer of methyl methacrylate and methyl acrylate.

The hindered amines, identified in Table VI by Roman numerals I–XI are identified by structure (and tradename where a commercial product is involved) immediately after the Table.

TABLE VI

| | | | | Thermal Stability | | Resistance to Ultraviolet | | | |
|---|---|---|---|---|---|---|---|---|---|
| | | Amine | | Change in | Decompo- | | | Transmission at | |
| Ex. | | | Amt | Vicat Softening | sition | Change in | | 300 nm | |
| No. | Polymer | No. | (Wt. %) | Temp. | (°C.) | After 1000 hrs. | After 1 yr. | Before | After 1000 hrs. |

TABLE VI-continued
| # | | | | | | | | |
|---|---|---|---|---|---|---|---|---|
| 7 | MM | I | 0.1 | −8 | 270 | 156 | 146 | |
| 8 | MM/MA | " | 0.25 | | | 200 | 230 | 70 | 71 |
| 9 | " | II | 0.1 | | | | | 69 | 71 |
| 10 | " | III | " | | | | | 71 | 70 |
| 11 | MM | IV | 0.05 | −2 | | 100 | 100 | |
| 12 | MM/MA | " | 0.01 | | | | | 60 | 58 |
| 13 | MM | V | 0.05–0.1 | +2 | | | | |
| 14 | MM/MA | " | " | −6 | 286 | | | 77 | 76 |
| 15 | MM | VI | | | | | | |
| 16 | MM/MA | " | | | | | | 85 | 88 |
| 17 | MM | " | 0.1 | | | | | 86 | 63 |
| 18 | " | VII | 0.2 | −9 | 252 | | | 84 | 83 |
| 19 | MM/MA | " | " | | | | | 87 | 40 |
| 20 | MM | " | " | | | | | 85 | 88 |
| 21 | " | VIII | " | | 255 | | | |
| 22 | MM/MA | IX | " | | | | | 87 | 59 |
| 23 | MM | " | " | | | | | 86 | 37 |
| 24 | " | X | " | | | | | 86 | 77 |
| 25 | MM/MA | " | " | | | | | 78 | 71 |
| 26 | " | XI | 0.1 | | | | | |
| 27 | MM | II | 0.006 | +1 | 255 | 298 | | |
| Comparison | | | | | | | | |
| 28 | MM | — | | −15 | 215 | 640 | 635 | 85 | 8 |
| 29 | MM/MA | — | | | | | | 67 | <47 |
| | | | | | | | | (47 after 72 hrs) |
Amine structures
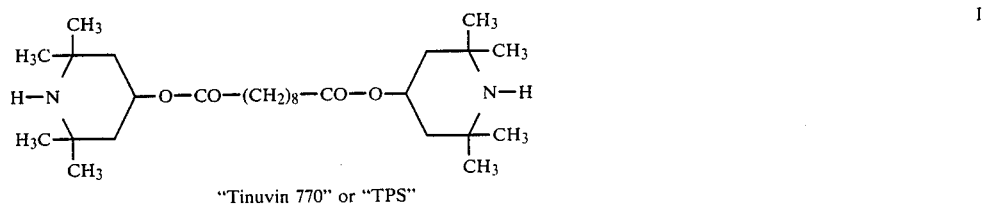
"Tinuvin 770" or "TPS"    I
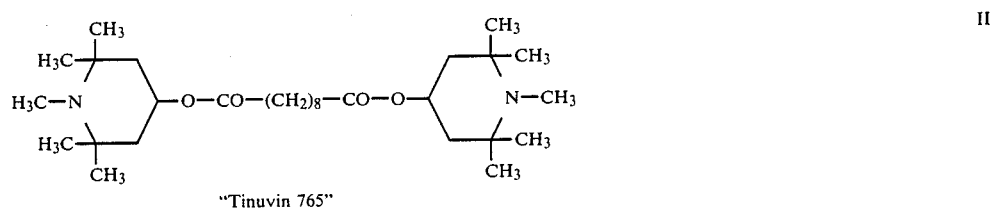
"Tinuvin 765"    II
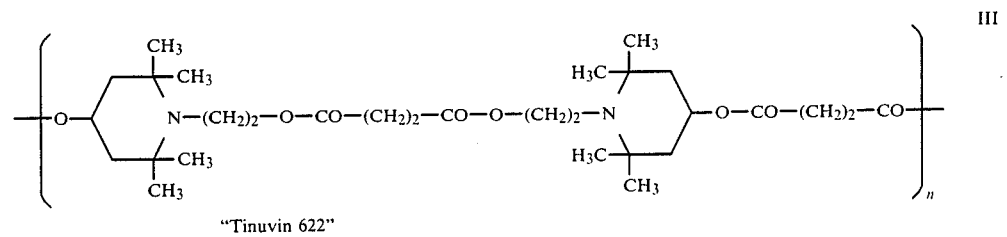
"Tinuvin 622"    III
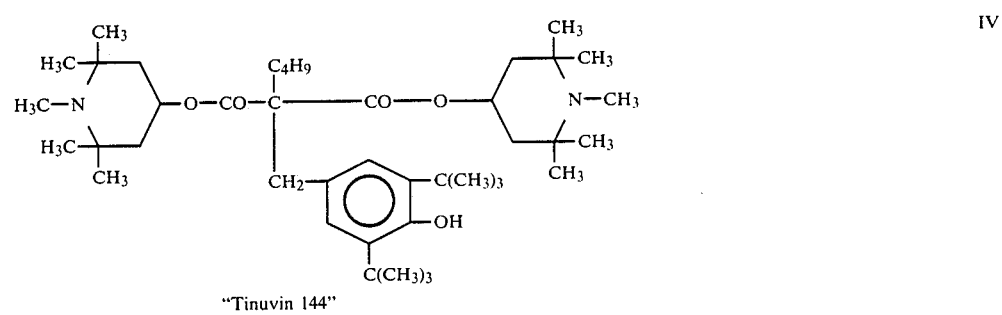
"Tinuvin 144"    IV

TABLE VI-continued

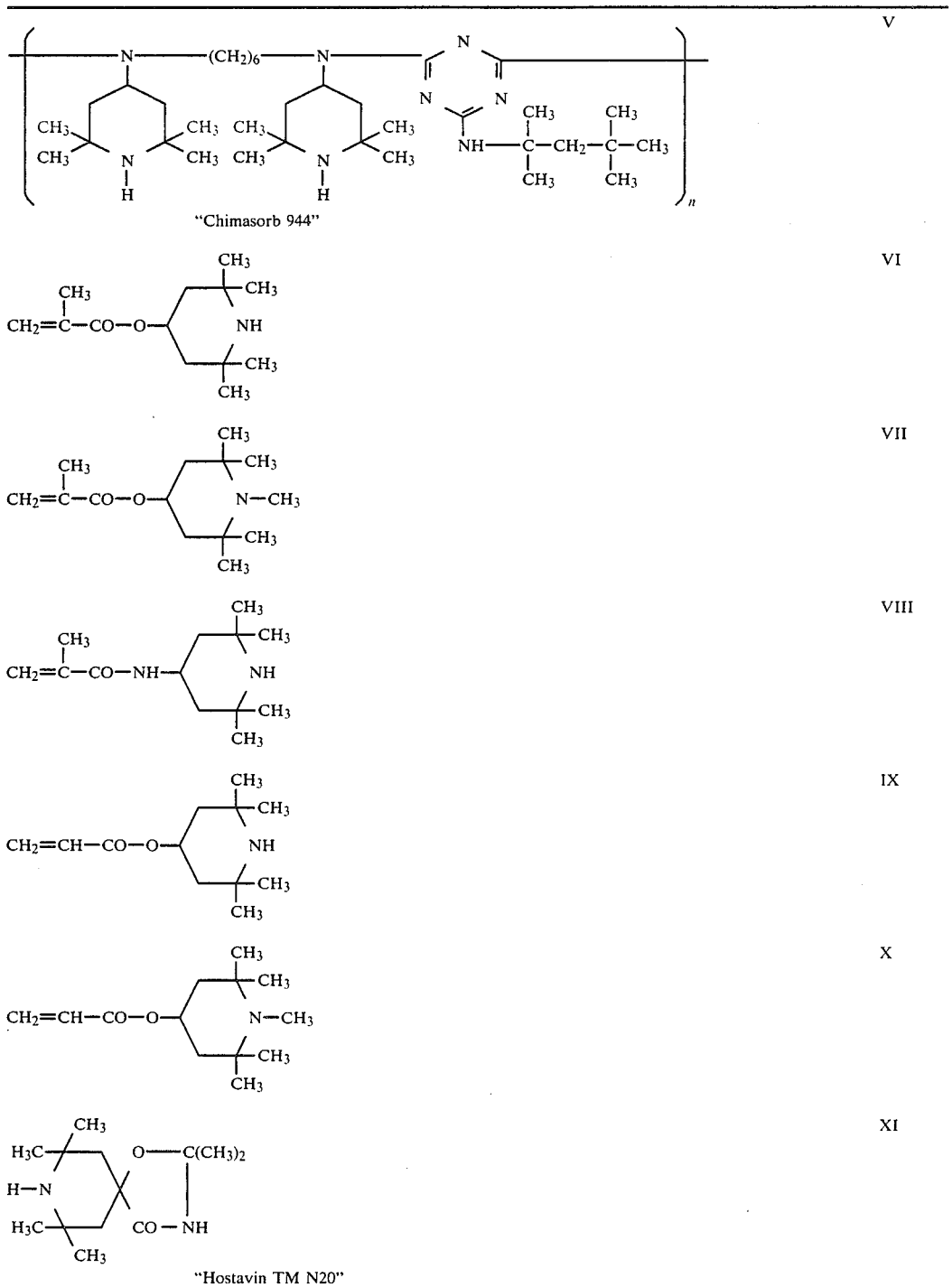

What is claimed is:

1. A method for making a methyl methacrylate polymer having high resistance to ultraviolet radiation and thermal damage, which method comprises polymerizing methyl methacrylate or a monomer mixture comprising at least 80 percent by weight of methyl methacrylate in the presence of a free radical-forming initiator and in the presence of 0.01 to 1 percent, by weight of the methyl methacrylate or monomer mixture, of a sterically hindered amine of the formula

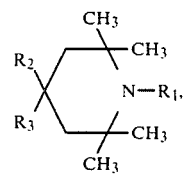

wherein
$R_1$ is hydrogen or alkyl having 1 to 4 carbon atoms,

R₂ taken alone is hydrogen or alkyl having 1 to 10 carbon atoms,

R₃ taken alone is alkyl having 1 to 10 carbon atoms, or

R₂ and R₃ taken together with the carbon atom to which they are attached form a 5- or 6-membered heterocycle wherein the hetero atoms are oxygen and/or nitrogen, or such a heterocycle substituted by alkyl and/or oxo.

2. A method for making a methyl methacrylate polymer having high resistance to ultraviolet radiation and thermal damage, which method comprises polymerizing methyl methacrylate or a monomer mixture comprising at least 80 percent by weight of methyl methacrylate in the presence of a free radical-forming initiator and in the presence of 0.01 to 1 percent, by weight of the methyl methacrylate or monomer mixture, of a sterically hindered amine of the formula

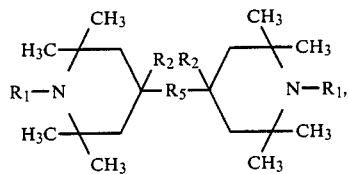

wherein
R₁ is hydrogen or alkyl having 1 to 4 carbon atoms,
R₂ is hydrogen or alkyl having 1 to 10 carbon atoms, and
R₅ is —O—CO—Hydrocarbon—CO—O—, wherein Hydrocarbon is alkylene having 2 to 20 carbon atoms or such alkylene substituted by phenyl or by substituted phenyl.

3. A method as in claim 2 wherein
R₁ is linear alkyl having 1 to 4 carbon atoms,
R₂ is hydrogen, and
R₅ is —O—CO—Hydrocarbon—CO—O— wherein Hydrocarbon is alkylene having 2 to 20 carbon atoms.

4. A method as in claim 2 wherein said monomer mixture comprises up to 15 percent by weight of an alkyl ester of acrylic acid having 1 to 4 carbon atoms in the alkyl portion and said sterically hindered amine is a di-(2,2,6,6-tetramethylpyridyl)-diester of an aliphatic dicarboxylic acid having 4 to 12 carbon atoms.

5. A method as in claim 2 wherein said amine is

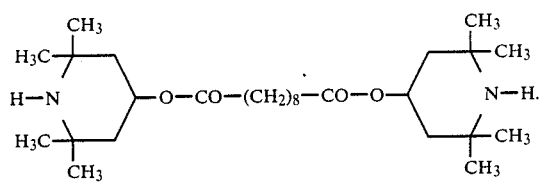

6. A method as in claim 2 wherein said amine is

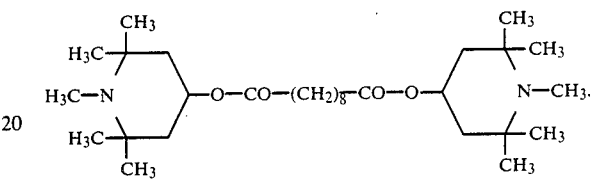

7. A method for making a methyl methacrylate polymer having high resistance to ultraviolet radiation and thermal damage, which method comprises polymerizing methyl methacrylate or a monomer mixture comprising at least 80 percent by weight of methyl methacrylate in the presence of a free radical-forming initiator and in the presence of 0.01 to 1 percent, by weight of the methyl methacrylate or monomer mixture, of a sterically hindered amine of the formula

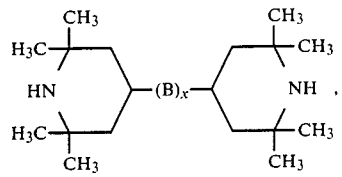

wherein B is —O—CO—(CH₂)ᵧ—CO—O—, x is 0 or 1, and y is an integer between 2 and 10.

* * * * * ered amine such as 2,2,6,6-tetramethyl piperidine.
REEXAMINATION CERTIFICATE (712th)
United States Patent [19]
Hosch

[11] B1 4,550,136
[45] Certificate Issued Jun. 30, 1987

[54] METHOD FOR POLYMERIZING METHYL METHACRYLATE

[75] Inventor: Ludwig Hosch, Michelstadt, Fed. Rep. of Germany

[73] Assignee: Rohm GmbH, Darmstadt, Fed. Rep. of Germany

Reexamination Request:
No. 90/001,126, Nov. 21, 1986

Reexamination Certificate for:
Patent No.: 4,550,136
Issued: Oct. 29, 1985
Appl. No.: 424,407
Filed: Sep. 27, 1982

Related U.S. Application Data

[63] Continuation-in-part of Ser. No. 409,714, Aug. 19, 1982, abandoned, which is a continuation of Ser. No. 130,092, Mar. 13, 1980, abandoned.

[30] Foreign Application Priority Data
Apr. 6, 1979 [DE] Fed. Rep. of Germany ....... 2913853

[51] Int. Cl.[4] .................... C08F 120/14; C08L 33/12
[52] U.S. Cl. .................................. 524/718; 524/99; 526/204; 526/329.7

[56] References Cited
FOREIGN PATENT DOCUMENTS
1466628  3/1977  United Kingdom .

OTHER PUBLICATIONS
Sankyo Corp. "Stabilizer for Polymers Sanol LS-770", Aug. 1973.

Primary Examiner—Paul R. Michl

[57] ABSTRACT

A method for making a methyl methacrylate polymer having high resistance to ultraviolet radiation and thermal damage by polymerizing methyl methacrylate or a monomer mixture predominantly comprising methyl methacrylate in the presence of a highly sterically hindered amine such as 2,2,6,6-tetramethyl piperidine.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *